United States Patent [19]
Sakakibara et al.

[11] Patent Number: 5,223,890
[45] Date of Patent: Jun. 29, 1993

[54] IMAGE PROJECTING APPARATUS PROVIDED WITH FILM CARRIER ALLOWING SELECTIVE LOADING OF ROLL FILM AND SHEET FILM

[75] Inventors: Katsunori Sakakibara, Fujisawa; Kenjiro Ishii, Sagamihara, both of Japan

[73] Assignee: Minolta Camera Kabushiki Kaisha, Osaka, Japan

[21] Appl. No.: 760,346

[22] Filed: Sep. 16, 1991

[30] Foreign Application Priority Data

| Sep. 18, 1990 | [JP] | Japan | 2-248400 |
| Sep. 18, 1990 | [JP] | Japan | 2-248401 |
| Sep. 18, 1990 | [JP] | Japan | 2-248402 |
| Sep. 18, 1990 | [JP] | Japan | 2-248403 |

[51] Int. Cl.⁵ .................................................. G03B 13/28
[52] U.S. Cl. ....................................................... 355/75
[58] Field of Search .................................. 355/44, 45, 75

[56] References Cited

FOREIGN PATENT DOCUMENTS 57-163223 10/1982 Japan.
59-43554 12/1984 Japan.

Primary Examiner—Monroe H. Hayes
Attorney, Agent, or Firm—Willian Brinks Olds Hofer Gilson & Lione

[57] ABSTRACT

A film carrier is incorporated in an image projecting apparatus and adapted to allow loading thereon of a microfilm of either of the roll film and sheet film types. This film carrier is provided with a base plate and a roll unit disposed as separated by a gap on the base plate and adapted to convey a roll film. A first moving member is disposed on the base plate in such a manner as to be moved both ways in the lateral direction of the image projecting apparatus. This first moving member is provided with a glass plate adapted to retain a stated image frame from the roll film in the part of the image projecting apparatus falling on a projected light path. Further, a second moving member is disposed on the base plate in such a manner as to be moved in the lateral direction and the longitudinal direction. This second moving member is provided with a glass plate for retaining a sheet film. The second moving member is caused to assume a retracting position when the glass plate of the first moving member is located at the position of the projected light path. The first moving member is caused to assume a retracting position when the glass plate of the second moving member is located at the position of the projected light path. The second moving member is locked at the retracting position.

28 Claims, 9 Drawing Sheets

IMAGE PROJECTING APPARATUS PROVIDED WITH FILM CARRIER ALLOWING SELECTIVE LOADING OF ROLL FILM AND SHEET FILM

BACKGROUND OF THE INVENTION

1. Field of the Invention:

This invention relates to a microfilm carrier which is capable of selectively using a microfilm of either the roll film type or the sheet film type.

2. Description of the Prior Art:

A reader is used for the purpose of projecting onto a screen the information recorded on the microfilm and a reader printer combines the function of projecting recorded information with the function of printing the projected information. The microfilms which are used in such image projecting apparatuses as readers and reader printers are divided by form into two groups, i.e. open reel type or cartridge type rolls of film or roll films and microfiche, aperture card, or film jacket type sheets of film or sheet films.

Japanese Patent Application Laid-Open 57-163,223 discloses a film carrier which is capable of selectively using a microfilm of either the roll film type or the microfiche type. In the conventional microfilm carrier disclosed in this patent specification, a movable carrier is fixed on the main body frame of an image projecting apparatus such as a reader in such a manner as to be moved in the longitudinal direction relative to the main body frame, a carrier plate is mounted on the movable carrier so as to be moved in the lateral direction, and a carrier glass for a microfiche and a carrier glass for a roll film are both attached integrally to the carrier plate.

The conventional microfilm carrier described above suffers a dimensional increase of the film carrier in the longitudinal direction because the two carrier glasses are disposed as longitudinally separated on the carrier plate so as to be jointly moved with the carrier plate. This microfilm carrier, therefore, is deficient in operational efficiency because it requires to form a carrier moving part of a longitudinally large surface area and secure a large space for allowing the movement of such carrier glasses. Further, since the part for retaining the roll film is positioned on the front side of the carrier glass for the microfiche, this part constitutes an obstacle in the work of loading the microfiche or in the manipulation of the carrier glass for the microfiche.

SUMMARY OF THE INVENTION

An object of this invention is to provide a microfilm carrier which has a carrier glass for a roll film and a carrier glass for a sheet film disposed adjacently in the lateral direction and, therefore, allows a dimensional reduction in the direction of depth.

Another object of this invention is to provide a film carrier which is enabled to enjoy excellent operational efficiency by adapting the part for retaining a roll film to avoid obstructing the work of loading a sheet film or the work of manipulating a carrier glass for the sheet film.

Yet another object of this invention is to provide a film carrier so constructed that a carrier glass for a roll film is movable in the lateral direction and a carrier glass for a sheet film is movable in the longitudinal direction independently of the carrier glass for the roll film.

In accordance with the present invention, there is provided a film carrier for an image projecting apparatus capable of projecting images from a roll film and a sheet film retained so as to be conveyed, which film carrier comprises a base plate provided with a passage part allowing passage therethrough of a light for illuminating said film, a first moving member provided with a first retaining member for retaining said roll film in said passage part and disposed on said base plate in such a manner as to be moved in the direction of conveyance of said roll film, and a second moving member provided with a second retaining member for retaining said sheet film in said passage part and disposed on said base plate in such a manner as to be moved in the direction of conveyance of said roll film.

DESCRIPTION OF THE PREFERRED EMBODIMENTS

Now, the present invention will be described in detail below with reference to embodiments illustrated in the accompanying drawings.

Figure 1:
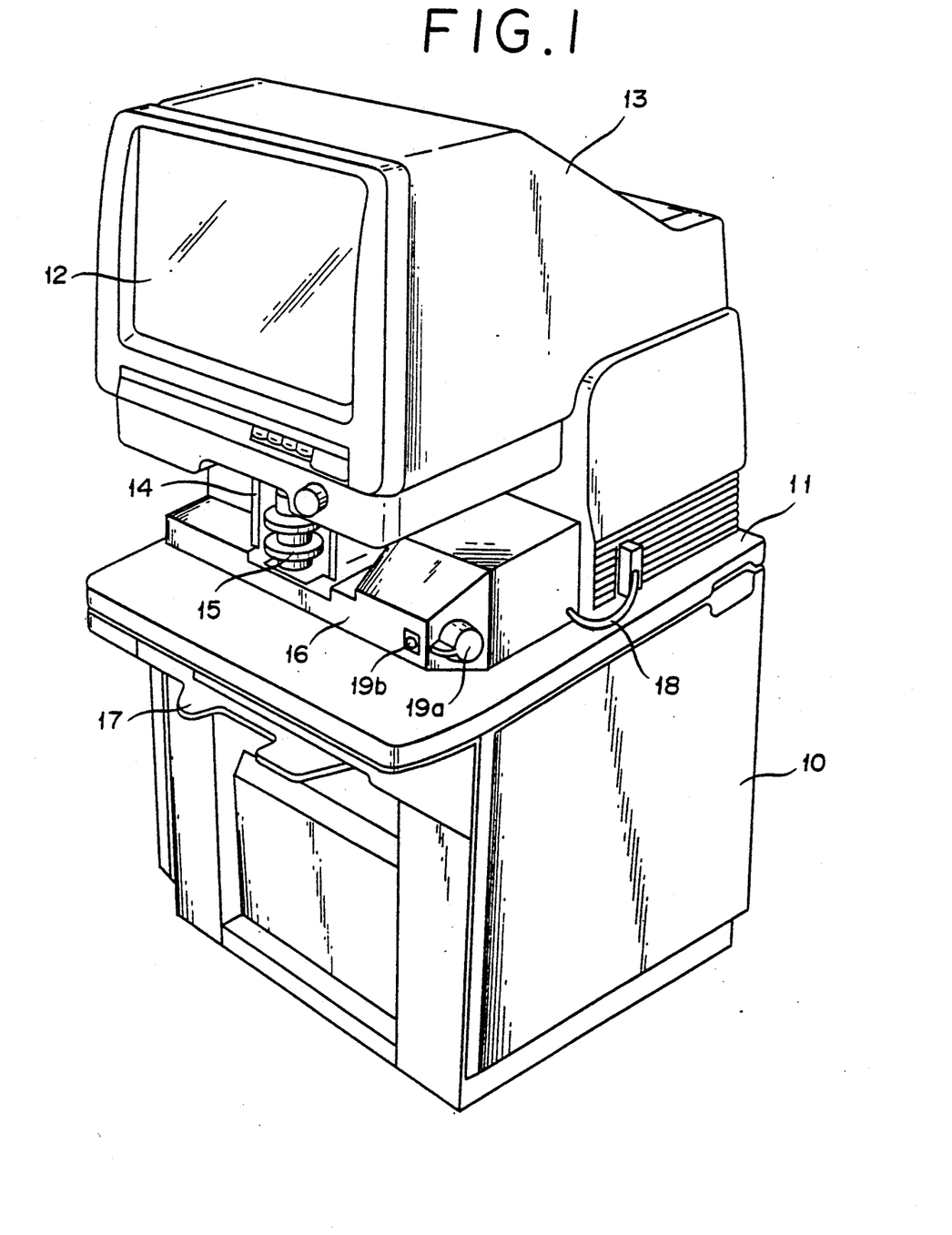
FIG. 1 is a perspective view illustrating a reader printer having a film carrier attached thereto.
Figure 2:
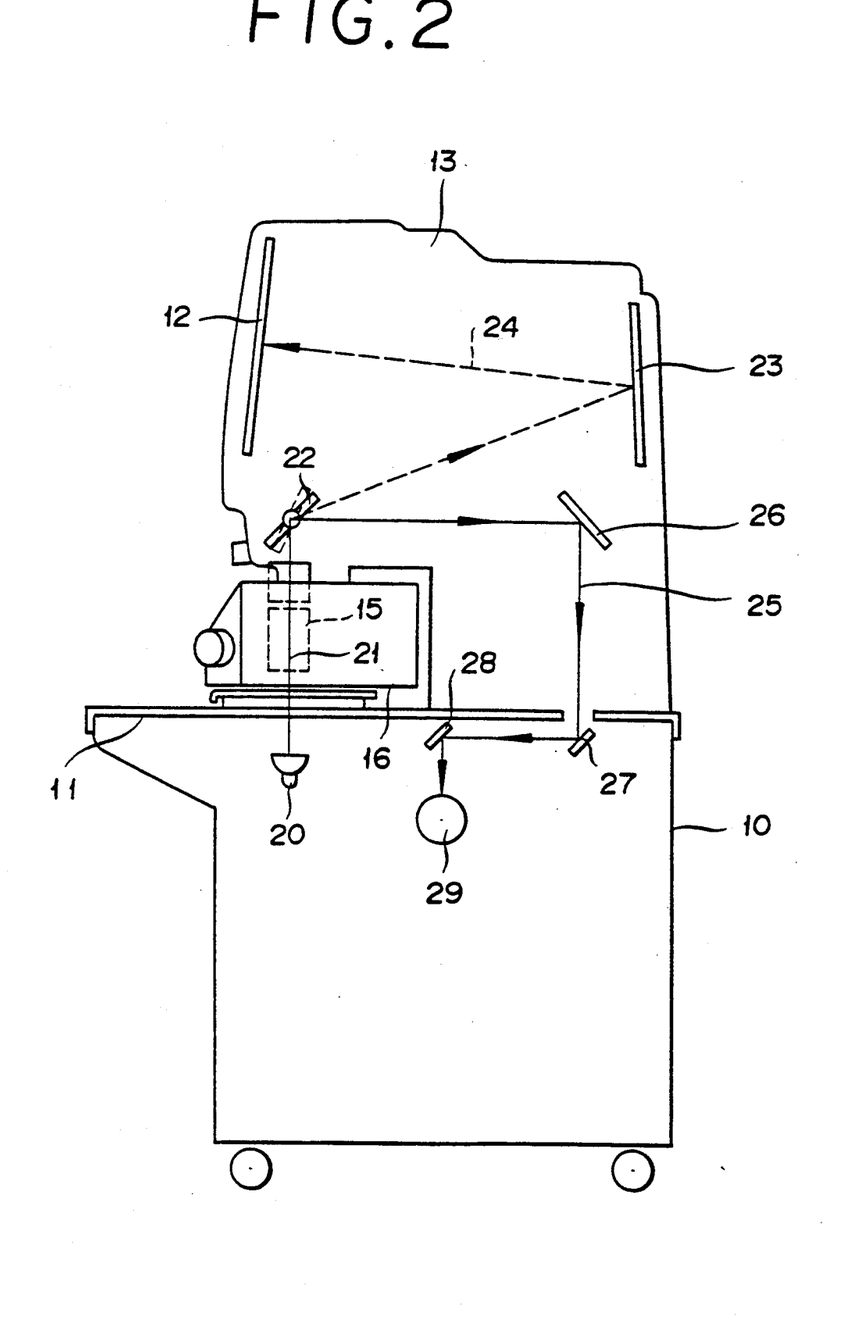
FIG. 2 is a cross section illustrating the internal construction of the reader printer of FIG. 1.

FIG. 1 and FIG. 2 are diagrams illustrating a reader printer. On a working table 11 fixed to a base part 10, a housing 13 furnished with a screen 12 is seated. This housing 13 is provided below the screen 12 with a lens holder 14. To this lens holder 14 is detachably attached a projecting lens 15. On the working table 11, a film carrier 16 for retaining a microfilm is installed.

As illustrated in FIG. 2, the light from a light source 20 is concentrated to form a projected light path 21 by a condenser lens (not shown). This projected light path 21 illuminates the image on a microfilm retained in the film carrier 16, passes the microfilm, and reaches the projecting lens 15. The image of the microfilm magnified by the projecting lens 15 reaches a movable mirror 22. In the reader mode of the reader printer, the movable mirror 22 is set at a position indicated by a broken line in FIG. 2. A reader light path 24 indicated by a broken line which is advanced via a stationary mirror 23 and brought to the screen 12 is formed inside the housing 13 to allow magnified projection of the image of the microfilm on the screen 12.

In the print mode of the reader printer which is intended to print the image of the microfilm on a recording paper, the movable mirror 22 is positioned as indicated by a solid line in FIG. 2 to form a print light path 25 indicated by a solid line in the place of the reader light path 24. The movable mirror 22 is gradually shaken from this position to effect a scanning. The reflected light from the movable mirror 22 is advanced via stationary mirrors 26 to 28 and directed to a photosensitive member 29 shaped like a drum inside the base part 10. As a result, the image of the microfilm is projected in the form of a magnified slit of light on the photosensitive member 29 being rotated synchronously with the scanning mentioned above. By the known process, the image of the microfilm is printed on the recording paper and the recording paper now containing the printed image is discharged from a tray 17 installed on the front side of the reader printer. Around the photosensitive member 29, known image-forming means (not shown) are disposed.

Now, the film carrier 16 will be described. This film carrier 16 is connected to the control part within the reader printer through the medium of a cable 18. FIGS. 3A to 3D are diagrams jointly illustrating the entirety of the film carrier 16. The film carrier 16 is composed of a glass unit 31 illustrated in FIG. 4, a roll unit 32 illustrated in FIG. 5, and an outer case unit 33 illustrated in FIG. 6.

Figure 4:
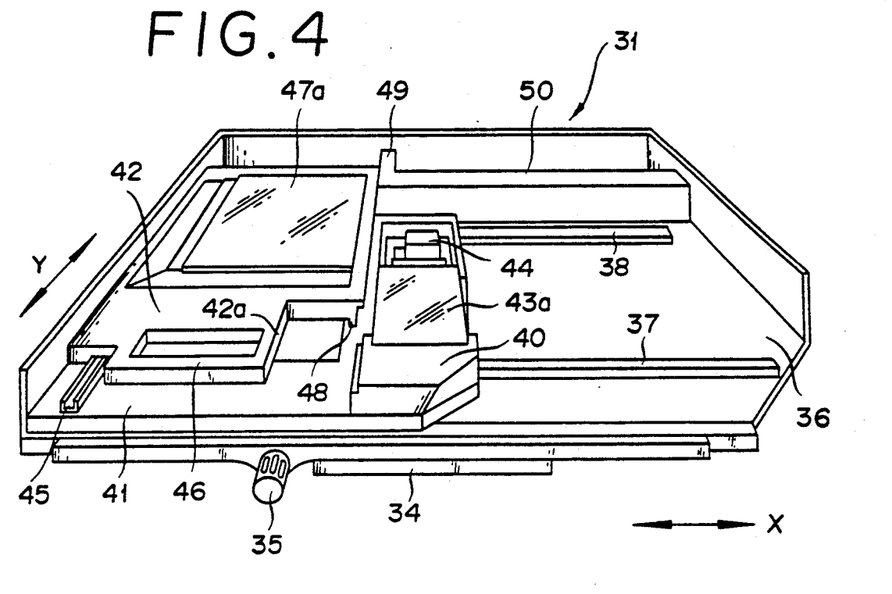
FIG. 4 is a perspective view illustrating a glass unit for a microfilm carrier.
Figure 10:
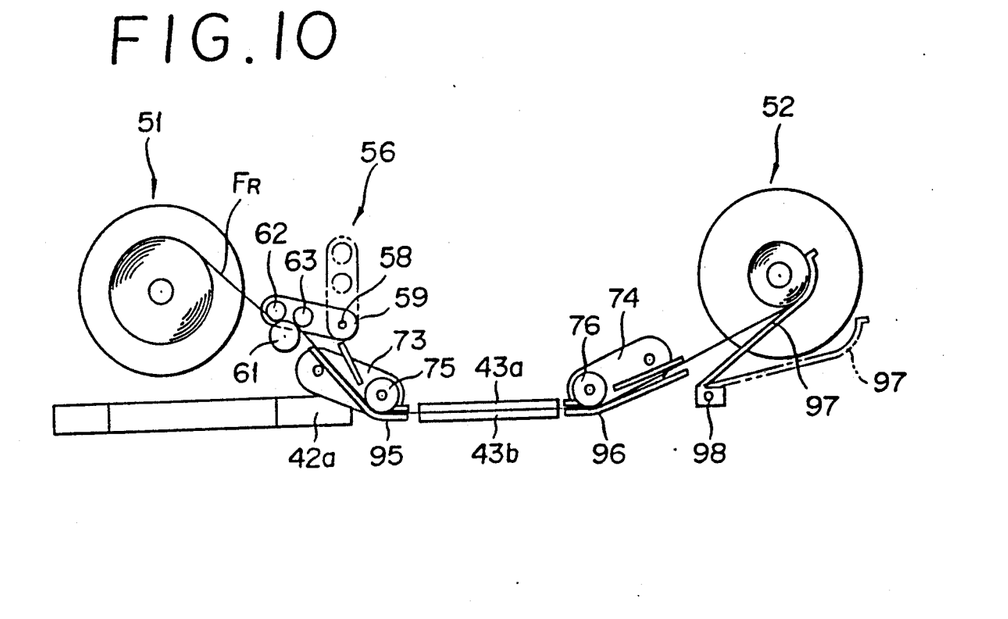
FIG. 10 is a cross section illustrating a conveying mechanism for the roll film.
Figures 11A, 11B:
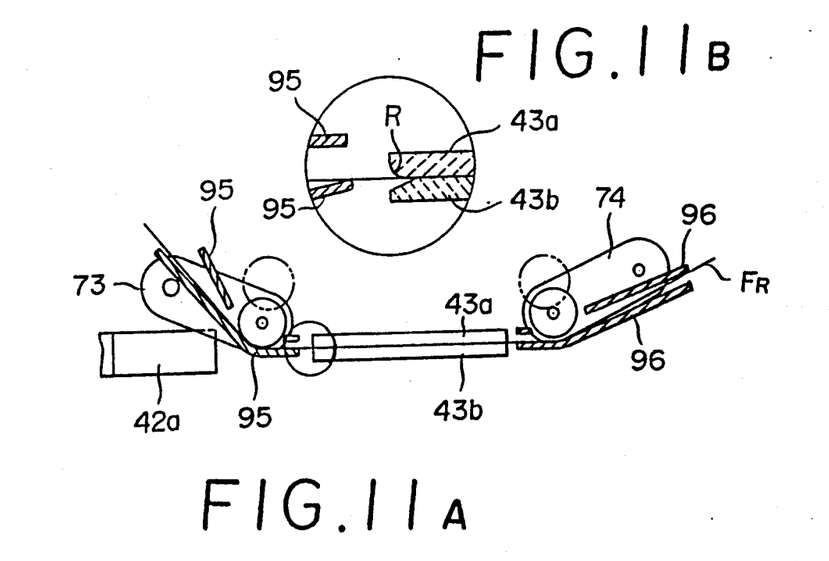
FIG. 11A is a cross section of the essential part of the conveying mechanism of FIG. 10 as posed in the state in which the second moving member is drawn out while the roll film is held as nipped by the carrier glass.
FIG. 11B is a magnified view illustrating a detail of the conveying mechanism of FIG. 11A.

The glass unit 31, as illustrated in FIG. 4, is so constructed that a supporting plate 34 located at the lowermost part thereof is attached to the reader printer. On this supporting plate 34, a base plate 36 which is provided at the leading terminal part thereof with a pinching part 35 is attached by means of a known construction (not shown) to the reader printer in such a manner that the position thereof is adjustable in the longitudinal direction, namely in the direction of the arrow mark Y, of the reader printer. Optionally, the movement of the base plate 36 in the direction of Y may be effected by means of a lever (not shown) attached shakably to the supporting plate 34. On the base plate 36, guide rails 37, 38 are laid as extended in the lateral direction. A first moving member 41 is set so as to be slid along these guide rails 37, 38 in the lateral direction, or the direction of the arrow mark X. A frame 40 for a glass plate is attached to the right terminal part of the first moving member 41. An upper carrier glass 43a for a roll film is fixed on the frame 40 and a lower carrier glass 43b for a roll film is disposed on the lower side of the upper carrier glass 43a as illustrated in FIG. 10 and FIGS. 11A and 11B so as to be moved into pressed contact with the upper carrier glass 43a. The movement of the lower carrier glass 43b to and away from the upper carrier glass is attained by means of a solenoid 44 attached to the frame 40. In the first moving member 41 and the base plate 36, through holes for passage of light paths (not shown) are formed at the positions corresponding to the positions of these carrier glasses 43a, 43b illustrated in FIG. 4. To the part of the roll film which is retained by the carrier glass 43b, the light from the light source is projected at the position of the through hole to effect projection of the image onto the screen 12.

In the left terminal part of the first moving member 41, a guide rail 45 extended in the longitudinal direction or the direction of Y is laid. A second moving member 42 is set on the first moving member 41 so as to be slid on the guide rail 45 in the direction of Y. The second moving member 42 is provided in the leading terminal part thereof with a handle 46 which is intended to be used for imparting thereto the sliding motion. Further, the second moving member 42 is provided in a notched part formed therein with an upper carrier glass 47a for sheet which is adapted so as to be opened and shut and enabled to cover the sheet film. On the lower side of this upper carrier glass 47a, a lower carrier glass 47b for sheet adapted to retain a sheet film FS is fixed as illustrated in FIG. 3D.

The guide rail 45 has a U-shaped cross section as illustrated in FIG. 4. Rollers (not shown) adapted to roll inside the guide rail 45 are attached to the second moving member 42. In the right terminal part of the second moving member 42, a sliding part 48 projected from the right terminal part is adapted to slide into contact with the surface of the first moving member 41. For the purpose of guiding the sliding motion of the first moving member 41, a guide rail similar in construction to the guide rail 45 may be attached to the base plate 36 to take the place of the two guide rails 37, 38 and a sliding member similar in construction to the sliding member 48 may be disposed on the lower side of the first moving member 41 along the direction of X.

When the first moving member 41 is positioned at the left terminal relative to the base plate 36 as illustrated in FIG. 4, the carrier glasses 43a, 43b for roll are made to occupy their positions in the central part of the base plate 36. As a result, the second moving member 42 can be positioned as retracted backwardly as illustrated on the first moving member 41. At this time, since the movement of the second moving member 42 in the direction of Y is attained independently of the first moving member 41, the carrier glasses 47a, 47b for the sheet film can be moved lightly. For the purpose of prohibiting the first moving member 41 from being slid in the direction of X while the second moving member 42 is remaining at the retracted position, a beam member 49 adapted to produce mutual interference with the second moving member 42 and extended in the direction of Y and a beam member 50 integrated with the beam member 49 are attached to the right corner part of the base plate 36.

Figure 5:
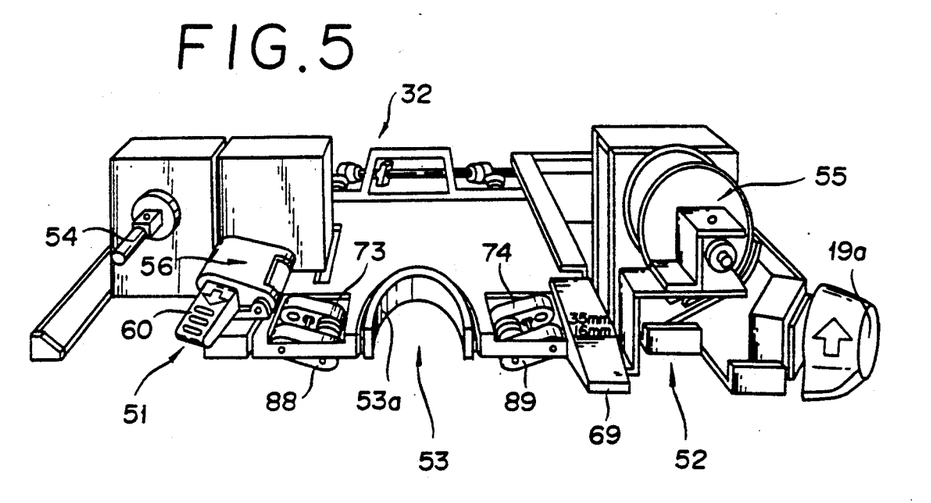
FIG. 5 is a perspective view illustrating a roll unit for the film carrier.

The roll unit 32 illustrated in FIG. 5 is set in place on the base plate 36 so as to contact the upper surfaces of these beam members 49, 50. The roll unit 32 is set on the base plate 36 as covered with the outer case unit 33 illustrated in FIG. 6. While the roll unit 32 remains in its set state, a gap for allowing the two moving members 41, 42 to slide is formed between the moving members 41, 42 and the roll unit 32.

By causing the first moving member 41 to slide in the lateral direction as described above, the carrier glasses 43a, 43b for the roll film or the carrier glasses 47a, 47b for the sheet film are selectively located at the pertinent position on the projected light path 21. Thus, the reader printer is allowed selectively to use microfilms of both the roll film and sheet film types without requiring an addition to the width of the film carrier 16 in the longitudinal direction.

The roll unit 32, as illustrated in FIG. 5, is composed of three blocks, i.e. a center unit part 53 and a first roll unit part 51 and a second roll unit part 52 which are located at the opposite sides of the center unit part 53. The first roll unit part 51 serves as a roll film supply part and the second roll unit 52 as a roll film takeup part. In the center unit part 53 is formed a projected light path passage part 53a for allowing passage of the projected light path. This passage part 53 corresponds to a passage part formed in the base plate 36.

Figure 6:
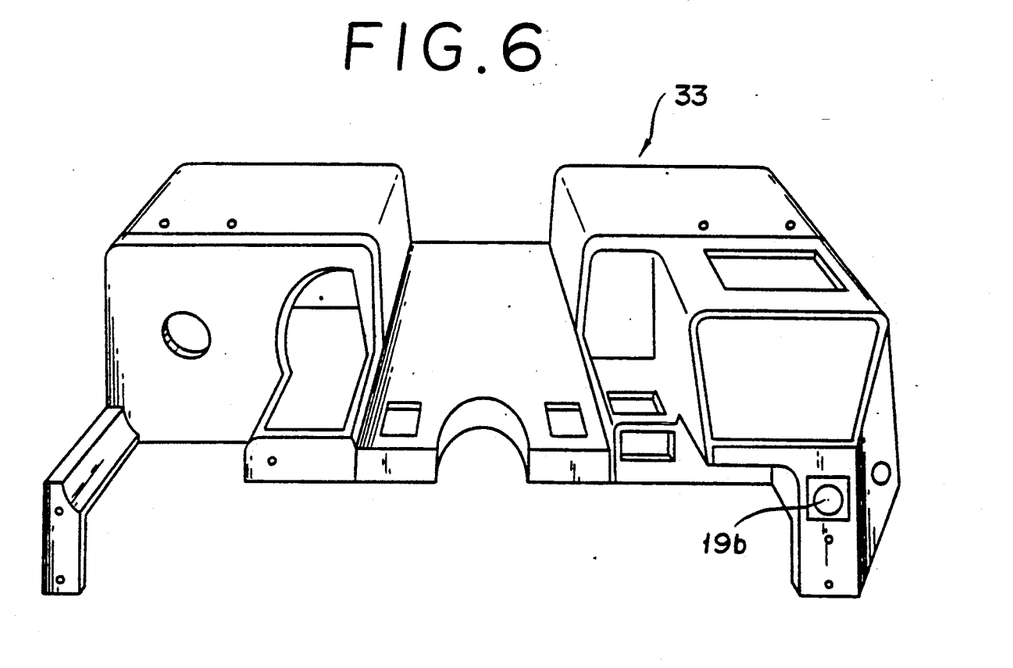
FIG. 6 is a perspective view illustrating an outer case unit for the film carrier.

The conveyance of the roll film loaded in the roll unit 32 is controlled by the operation of a controller 19a which is provided in the second roll unit part 52. The conveyance of the roll film is effected in the lateral direction of the film carrier. Since the controller 19a is disposed not on the front side of the film carrier 16 but in the corner part formed in the terminal part on the front side as illustrated in the diagram, it does not constitute an obstacle when the sheet film is selected and the handle 46 is operated. The reference numeral 19b stands for a loading button which is operated when the film carrier 16 is loaded with a roll film. This loading button is attached, as illustrated in FIG. 6, to the outer case unit 33.

Figure 7:
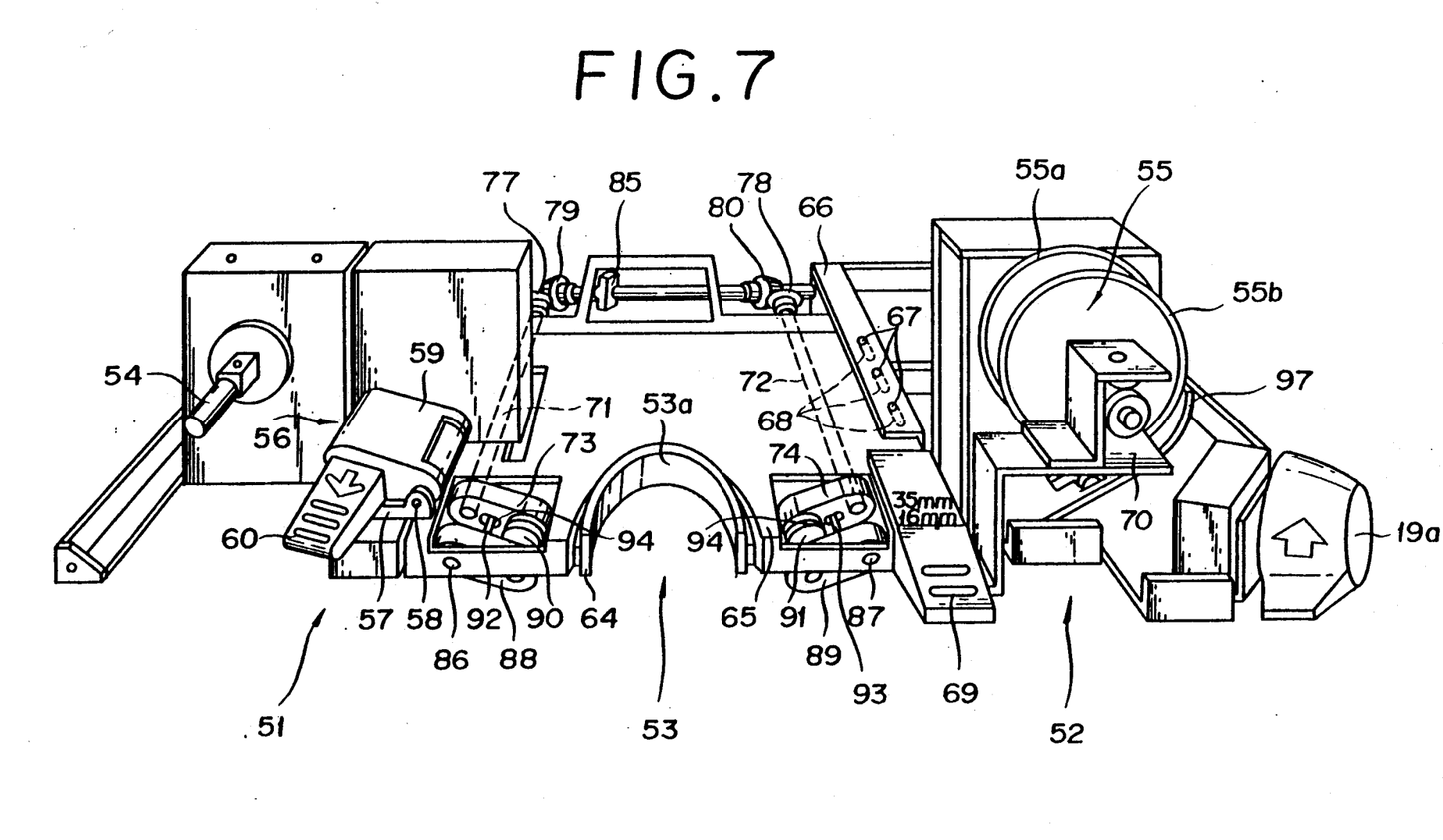
FIG. 7 is a magnified perspective view of the roll unit shown in FIG. 5.

As illustrated in FIG. 7, the first roll unit 51 is provided with a roll fitting shaft 54 for supporting a roll film FR. The roll film is played out of the roll fitting shaft 54 and rewound on a takeup reel 55 which is installed in the second roll unit 52. Since the second moving member 42 which is provided with the glasses 47a, 47b for the sheet film is retained below the first roll unit part 51 while an image recorded on the roll film FR is being projected, the space for accommodating the second moving member 42 is effectively secured.

For the purpose of forwarding the leading terminal of the roll film to the takeup reel 55, the first roll unit 51 is provided with a loading part 56 which is disposed contiguously to the roll fitting shaft 54. This loading part 56 is provided with a bracket 57 fixed to the first roll unit 51 and an arm part 59 rotatably attached to the bracket 57 by means of a pin 58. When a handle 60 which is attached to the arm part 59 so as to be moved in the direction of Y is pulled in the direction of the arrow mark inscribed therein, the lock is released and the arm part 59 can be opened by being rotated.

The bracket 57 is provided with a drive roller 61 and the arm part 59 is provided with two following rollers 62, 63 which are pressed against the drive roller 61 as illustrated in FIG. 10. When the arm part 59 is kept in an opened state as indicated by a two-dot chain line in FIG. 10 and the leading terminal of the roll film FR is nipped between the drive roller 61 and the following rollers 62, 63, therefore, desired unrolling of the roll film FR is attained by setting the roller in rotation.

The film carrier 16 is adapted so as to allow selective loading thereon of a film having a width of 16 mm and a film having a width of 35 mm. On a center frame 64 which constitutes a seating part for the center unit 53, therefore, a changeover plate 65 is mounted so as to be slid in the longitudinal direction as illustrated in FIG. 7. For the purpose of limiting the range in which the changeover plate 65 is allowed to slide, a plurality of projections 67 are fixed on a guide frame 66 which is integrated with the center frame 64 and oblong holes 68 adapted to engage with these projections 67 are formed in the changeover plate 65. The changeover plate 65 is slid in the longitudinal direction over a distance which is the difference between the widths of the two different films. To produce this slide, the operator manipulates a changeover handle 69 which is integrated with the changeover plate 65. The letters "35 mm" and the letters "16 mm" are inscribed in the handle 69. By moving the changeover plate 65 by means of the handle 69, either of the two sets of letters are exposed through an opening part formed in the outer case unit 33 as illustrated in FIG. 3 to display to the operator the width of the roll film FR currently loaded in the reader printer.

The takeup reel part 55 comprises a rear disk 55a and a front disk 55b as illustrated in FIG. 7. The front disk 55b is retained on a retaining member 70 which is integrated with the changeover plate 65. This front disk 55b is moved toward and away from the rear disk 55a as synchronized with the changeover plate 65. As a result, the width of the takeup reel 55 equals the width of the roll film loaded in the reader printer.

For the purpose of guiding the part of the roll film between the loading part 56 and the takeup reel 55, the center unit part 53 is provided with a plurality of guide rollers. These guide rollers must be inched out in the direction of the base plate 36 to their working position when the roll film FR is used, whereas they must be moved in the direction of the roll unit 32 to their retracted position to prevent the guide rollers from interfering with the upper carrier glass 47a for the sheet.

Figure 8:
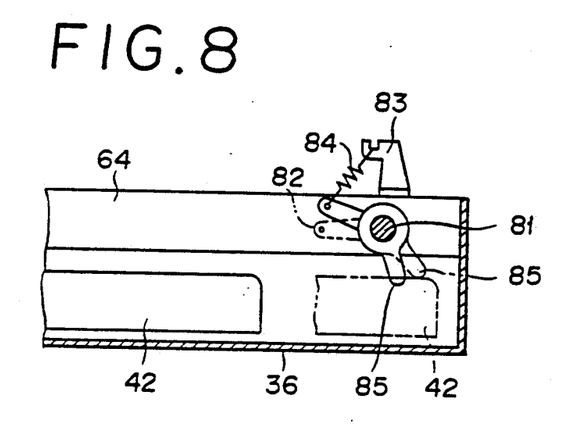
FIG. 8 is a cross section illustrating the state of union between the second moving member and an operating lever.

Now, the mechanism for retracting the guide rollers will be described below with reference to FIG. 8, FIG. 9, and FIG. 10.

Figure 9:
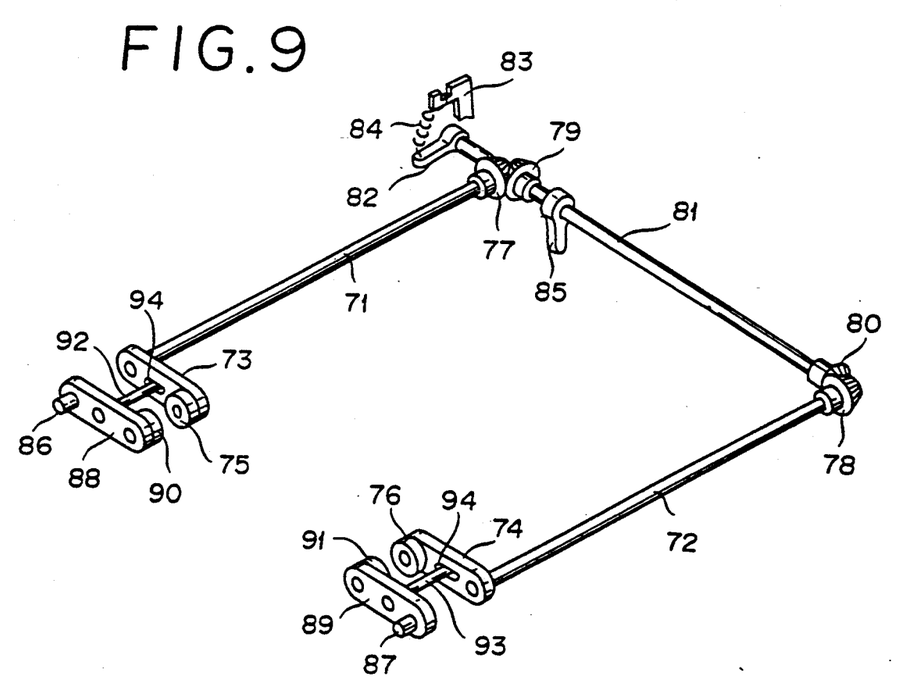
FIG. 9 is a perspective view illustrating an arm shaking mechanism to be actuated by the second moving member.

To the leading terminal parts of two following shafts 71, 72 which are rotatably attached as directed longitudinally to the center frame 64, arms 73, 74 are respectively fixed as illustrated in FIG. 9. Guide rollers 75, 76 are rotatably attached to the leading terminals of the arms 73, 74. Bevel gears 77, 78 are fixed respectively to the rear terminal parts of the following shafts 71, 72. Bevel gears 79, 80 which are respectively meshed with the bevel gears 77, 78 are fixed on a drive shaft 81. A spring member 84 is set in place between a drive lever 82 fixed on the drive shaft 81 and a bracket 83 fixed on the center frame 64. By dint of this spring member 84, the resilient force is exerted through the medium of the drive shaft 81 and the following shafts 71, 72 to the guide roller 75, 76 to urge the guide rollers 75, 76 upwardly, namely in the retracting direction toward the roll unit 32. Further, an operating lever 85 is fixed to the drive shaft 81. This operating lever 85 faces downwardly as illustrated in FIG. 8 and assumes a position such that it contacts the second drive member 42 when this second moving member 42 is slid to the limit of its retracting stroke. When the second moving member 42 reaches the limit of the retracting stroke, the operating lever 85 is rotated in spite of the resilient force of the spring member 84 as indicated by a two-dot chain line in FIG. 8. As a result, the guide rollers 75, 76 are forced out downwardly, i.e. toward the base plate 36, and brought to their working position as illustrated in FIG. 10.

To the part provided at the leading terminal of the changeover plate 65 and bent downwardly, arms 88, 89 are rotatably attached through the medium of supporting shafts 86, 87 which are positioned coincidently with the following shafts 71, 72 as illustrated in FIG. 7. Guide rollers 90, 91 are rotatably attached to the leading terminals of the arms 88, 89. Engaging pins 92, 93 fixed to these arms 88, 89 are engaged with oblong holes 94, so that the the arms 88, 89 are shaken synchronously with the rotation of the arms 73, 74. Since the movement of the changeover plate 65 in the opposite longitudinal directions results in the movement of the arms 88, 89 toward and away from the arms 73, 74 and consequently in the change in the distances between the guide rollers 75, 76 and the guide rollers 90, 91, it can be utilized in changing the distances between the pairs of guide rollers proportionately to the width of a roller film to be selected.

To the arms 73, 74 are respectively attached guide plates 95, 96 for guiding the roll film as illustrated in FIG. 10. For the pair of arms 88, 89 which adjoin the arms 73, 74, guide plates unshown in the drawing are similarly provided. By the same token, in the second roll unit part 52, a guide plate 97 for guiding the roll film to be rewound on the takeup reel 55 is attached so as to be shaken around a supporting shaft 98 as a center. This guide plate 97 fulfills the function of guiding the leading terminal of the film FR in the direction of the takeup reel 5 when the roll film is to be loaded, namely when the leading terminal of the roll film FR is wrapped around the takeup reel 55. It is kept in its retracted position indicated by a two-dot chain line unless during the loading of the roll film.

The state of the roll film FR being rewound on the takeup reel 55 with the arms 73, 74 kept in their operative positions in conjunction with the arms 88, 89 is depicted by the diagram of FIG. 10. In this case, the guide rollers 75, 76 are thrust out to the position of the notch 42a formed in the right terminal of the second moving member 42 as illustrated. When the second moving member 42 is drawn toward the front side while the roll film FR remains loaded in the roll unit 32 as described above, since the guide plates 95, 96 contact the roll film FR in spite of the release of contact between the second moving member 42 and the operating lever 85, the guide rollers 75, 76 are not allowed to move to the stated retracting positions. As a result, the second moving member 42 cannot be drawn out any farther toward the front side because any farther forward draw of the second moving member 42 inevitably causes the second moving member 42 to collide against the arm 73. Thus, the arm 73 additionally functions as a locking mechanism for precluding the use of the sheet film FS while the roll film FR remains loaded. For the purpose of preventing the roll film FR in this state from sustaining an injury, the leading terminals of the guide plates 95, 96 are rounded as illustrated in FIG. 11B and the lateral surfaces of the upper glass 43a for the roll film are chamfered.

As another locking mechanism for precluding the second moving member 42 from being accidentally drawn out while the roll film FR is loaded in the roll unit 32, a construction such that a claw member adapted to be joined with the second moving member 42 is actuated by means of a solenoid when the second moving member 42 is received into the retracted position may be used instead of the construction described above. In this case, a photosensor capable of detecting the presence or absence of the roll film FR is disposed on the upstream side of the guide roller 75 in the direction of conveyance of the film and the solenoid is turned on by the signal from this photosensor. Owing to this construction, the second moving member 42 is allowed to be moved in the longitudinal direction only when the roll film FR is removed from the space intervening between the carrier glasses 43a, 43b. As yet another locking mechanism, a construction such that the same claw member as described above is used and a solenoid for actuating this claw member is adapted to be operated by the attachment or detachment of the roll film to or from the roll fitting shaft 54 may be adopted. Owing to this construction, the sheet film FS is allowed to be loaded only when the roll film is removed from the roll fitting shaft 54.

Now, the procedure for the operation of the film carrier 16 described above will be explained below.

Figure 3A:
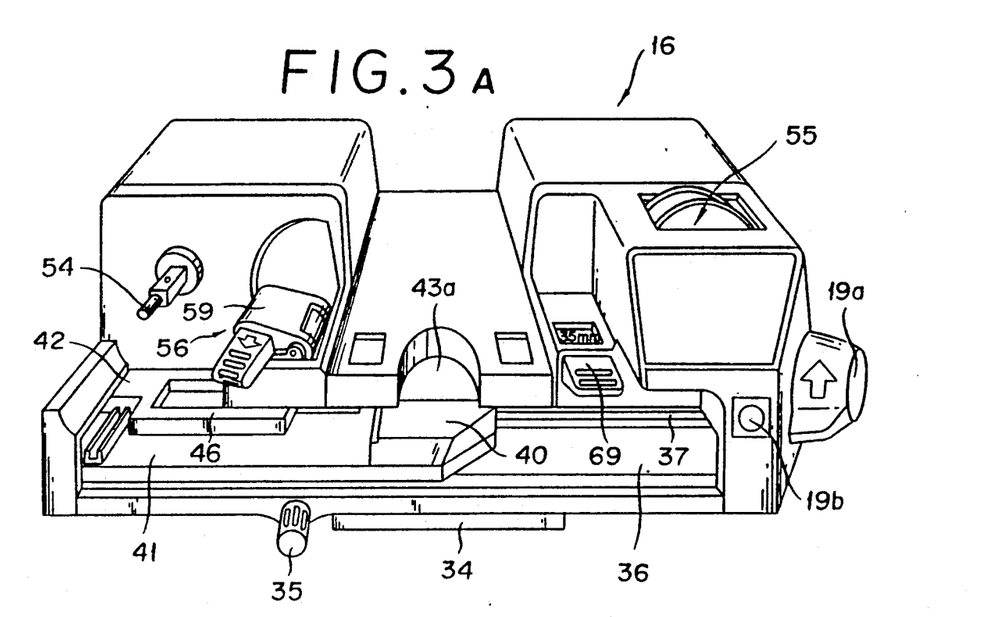
FIG. 3A is a perspective view illustrating the film carrier posed in a state in which a first moving member is in the projecting position and a second moving member is in the retracted position.

FIG. 3A represents the state in which the roll film is ready for use, with the first moving member 41 kept at the leftmost terminal position. The second moving member 42 meanwhile is kept at the rearmost retracted position. This second moving member 42 is accommodated within the empty space formed between the roll unit 32 and the base plate 36. The positions of these moving members 41, 42 are represented in the diagram of FIG. 4. In this case, the arms 73, 74 and the arms 88, 89 as well are caused to occupy the positions indicated in FIG. 10 owing to the fact that the second moving member 42 depresses the operating lever 85.

It is in the ensuant state that the roll film FR is destined to be attached to the roll fitting shaft 54. Preparatorily to this attachment, the changeover plate 65 is given an adjusted movement by the handle 69 proportionately to the width of the roll film FR. Subsequently, when the leading terminal of the roll film FR is nipped in the loading part 56 and the loading button 19b is depressed, the leading terminal of the film is wrapped around the takeup reel 55 and the roll film FR is readied to be searched for retrieval of a desired image out of the images recorded thereon. This operation of retrieval is carried out by the controller 19a. At this time, the positional adjustment of the projected light path 53a may be attained by giving an adjusted movement to the base plate 36 in the longitudinal direction by means of the film carrier 16 and finely adjusting the position of the film carrier 16 in the longitudinal direction. As a result, in the frames containing the images recorded on the roll film FR, the positions of those frames which are retained on the lower carrier glass 43b are adjusted relative to the passage part for the projected light path.

When the search is to be completed, by continuing the operation of the controller 19a, the roll film FR is wholly returned to the first roll unit part 51. When an attempt is made at drawing the second moving member 42 toward the front side by means of the handle 46 while the roll film FR is not wholly returned but retained between the carrier glasses 43a, 43b for the roll, the second moving member 42 cannot be drawn out any farther because it interferes with the arm 73. When the roll film FR is loaded on the roll fitting shaft 54 while the reader printer is in the state illustrated in FIG. 3A, the roll film FR comes to hide part of the handle 46 of the second moving member 42 and the operation of the second moving member 42 during the loading of the roll film is consequently attained only with difficulty.

This difficulty brings about the advantage of preventing the second moving member 42 from the otherwise possible erroneous operation.

Figure 3B:
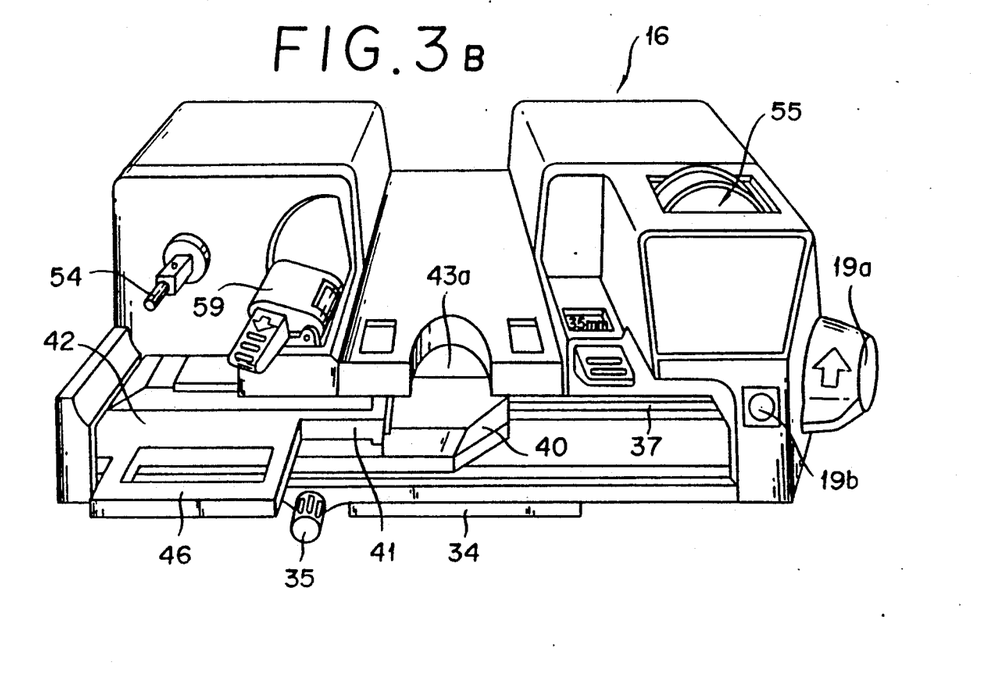
FIG. 3B is a perspective view illustrating the film carrier as posed in the state in which the second moving member is drawn out of the position thereof shown in FIG. 3A.
Figure 3C:
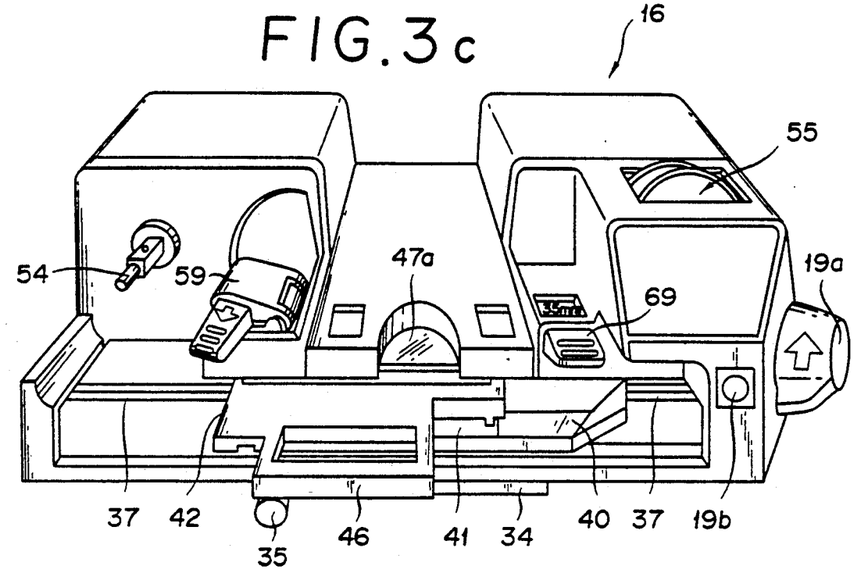
FIG. 3C is a perspective view illustrating the film carrier as posed in the state in which the second moving member is in the projecting position and the first moving member is in the retracted position.
Figure 3D:
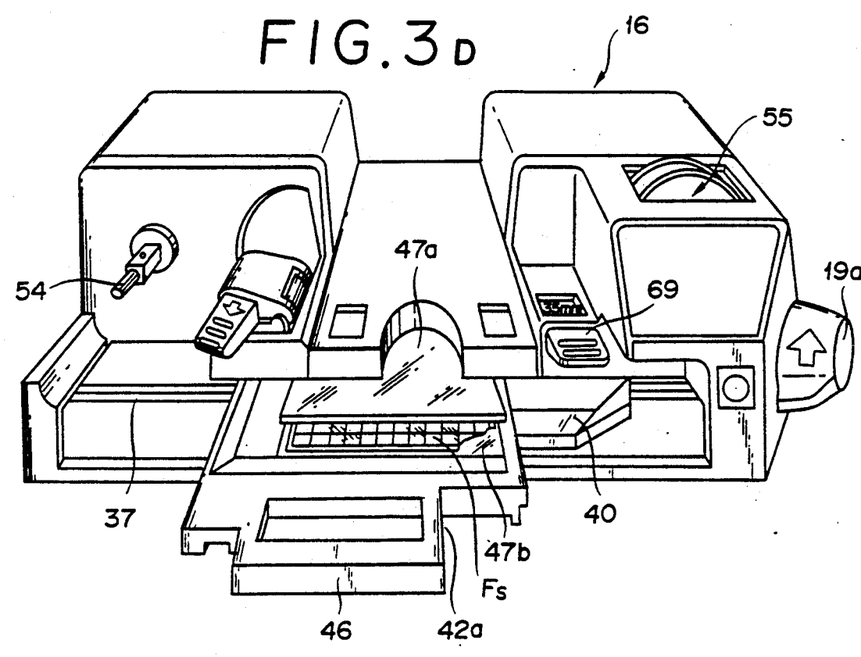
FIG. 3D is a perspective view illustrating the film carrier as posed in the state in which the second moving member is drawn out of the position thereof shown in FIG. 3C for the purpose of replacing or loading the sheet film.

In order for the sheet film such as, for example, a microfiche Fs to be loaded after the roll film FR is removed, the first step to be taken is to move the second moving member 42 toward the front side as illustrated in FIG. 3B. As a result, the arms 73, 74 and the arms 88, 89 as well are rotated to the retracted positions and consequently prevented from contacting the upper carrier glass 47a for the sheet film. By moving the second moving member 42 to the right from the position assumed in consequence of the movement mentioned above, the upper carrier glass 47a can be brought to the position directly below the projecting lens 15, namely to the position of the passage part for the projected light path as illustrated in FIG. 3C.

The upper carrier glass 47a for the sheet film can be opened by drawing the second moving member 42 farther to the front side as illustrated in FIG. 3D. In this state, the sheet film Fs can be loaded or replaced and it is eventually retained on the carrier glass 47b. The exchange of the microfilm loaded on the film carrier 16 from the sheet film Fs to the roll film FR is accomplished by reversing the procedure described above.

In the illustrated embodiment, the first roll unit 51 for the roll film supply part is disposed to the left of the roll unit 32 and the second roll unit part 52 for the roll film takeup part is disposed to the right thereof. Optionally, the positions at which these roll units 51, 52 are disposed may be reversed. Where the frame 40 for the glass is disposed in the left terminal part of the first moving member 41 and the roll film FR is loaded, the second moving member 42 may be received in the space to the right of the frame 40, namely in the space on the lower side of the second roll unit part 52. Though the second moving member 42 is depicted as mounted on the first moving member 41 so as to be moved in the longitudinal direction in the illustrated embodiment, the first moving member 41 may be mounted on the base plate 36 so as to be moved in the direction of X and, at the same time, the second moving member 42 may be mounted on the base plate 36 so as to be moved in both the direction of X and the direction of Y. In this case, for the purpose of selectively setting the carrier glass 43a for the roll film and the carrier glass 47a for the sheet film at the position of the passage part 53a for the projected light path, the two moving members 41, 42 may be adapted to be moved in the direction of X.

Further, in the illustrated embodiment, the roll film is depicted as conveyed by means of an electric motor and the sheet film as moved by manual power. Optionally, the two films may be adapted to be moved both by either electric power or manual power. Alternatively, only the sheet film may be adapted to be moved by means of an electric motor.

The film carrier 16 in the illustrated embodiment is depicted as disposed in the reader printer shown in FIG. 1 and FIG. 2. Optionally, it may be attached to the reader instead.

FIG. 3D represents the case in which a microfiche is loaded as the sheet film Fs or the sheetlike film. Optionally, such a sheet film as an aperture card or a film jacket may be loaded instead. Further, the roll film FR or the roll of microfilm may be of either the open reel type or the cartridge type.

While this invention has been illustrated and described in accordance with a preferred embodiment, it is recognized that variations and changes may be made and equivalents employed herein without departing from the invention as set forth in the claims.

What is claimed is:

1. A film carrier for an image projecting apparatus capable of projecting images from a roll film and a sheet film retained so as to be conveyed, comprising:
   a base plate provided with a passage part allowing passage therethrough of a light for illuminating said film;
   a first moving member provided with a first retaining member for retaining said roll film in said passage part and disposed on said base plate in such a manner as to be moved in the direction of conveyance of said roll film; and
   a second moving member provided with a second retaining member for retaining said sheet film in said passage part and disposed on said base plate in such a manner as to be moved in the direction of conveyance of said roll film.

2. A film carrier according to claim 1, wherein said second moving member is further movable in the direction perpendicular to the direction of conveyance of said roll film independently of said first moving member.

3. A film carrier according to claim 2, wherein said first moving member and said second moving member are integrally movable in the direction of conveyance of said roll film.

4. A film carrier according to claim 3, wherein said first moving member and said second moving member are arranged in the direction of conveyance of said roll film.

5. A film carrier according to claim 1, wherein said first moving member is supported on said base plate in such a manner as to be moved in the direction of conveyance of said roll film and said second moving member is supported on said first moving member in such a manner as to be moved in the direction perpendicular to the direction of conveyance of said roll film.

6. A film carrier, comprising:
   a base plate provided with a passage part allowing the passage therethrough of a light for illuminating a film;
   a first moving member provided with a first retaining member adapted to retain a roll film in said passage part and disposed on said base plate in such a manner as to be moved to a first projecting position in which said first retaining member is located at the position of said passage part and to a first retracting position in which said first retaining member retracted from said first projecting position is received; and
   a second moving member provided with a second retaining member adapted to retain said sheet film in said passage part and disposed on said base plate in such a manner as to be moved to a second projecting position in which said second retaining member is located at the position of said passage part and to a second retracting position in which said second retaining member retracted from said second projecting position is received.

7. A film carrier according to claim 6, which further comprises locking means for locking said second moving member at said second retracting position.

8. A film carrier according to claim 7, wherein said locking means locks said second moving member when said first retaining member is in a position at said first projecting position and, at the same time, said first retaining member retains roll film.

9. A film carrier according to claim 8, wherein said second moving member is provided in the front part thereof with a handle and said first moving member is moved to said first retracting position and said first projecting position as synchronized with the movement of said second moving member to said second projecting position and said second retracting position.

10. A film carrier according to claim 9, wherein said first moving member is supported on said base in such a manner as to be moved in the direction of conveyance of said roll film and said second moving member is supported on said first moving member in such a manner as to be moved in the direction perpendicular to the direction of conveyance of said roll film.

11. An image projecting apparatus, comprising:
a light source;
a base plate provided with a passage part allowing passage therethrough of a light projected from said light source;
an optical member for causing projection of said light passed through said passage part;
roll film conveying means disposed on said base plate and adapted to convey a roll film through the medium of said passage part;
a first moving member provided with a first retaining member for retaining said roll film in said passage part and disposed on said base plate in such a manner as to be moved in the direction of conveyance of said roll film; and
a second moving member provided with a second retaining member for retaining a sheet film in said passage part and disposed on said base plate in such a manner as to be moved in the direction of conveyance of said roll film.

12. An image projecting apparatus according to claim 11, wherein said second moving member is further movable in the direction perpendicular to the direction of conveyance of said roll film independently of said first moving member.

13. An image projecting apparatus according to claim 12, wherein said first moving member and said second moving member are integrally movable in the direction of conveyance of said roll film.

14. An image projecting apparatus according to claim 13, wherein said first moving member and said second moving member are arranged in the direction of conveyance of said roll film.

15. An image projecting apparatus according to claim 14, wherein said first moving member is supported on said base plate in such a manner as to be moved in the direction of conveyance of said roll film and said second moving member is supported on said first moving member in such a manner as to be moved in the direction perpendicular to the direction of conveyance of said roll film.

16. A film carrier, comprising:
a base plate provided with a passage part allowing passage therethrough of a light for projecting a film;
roll film conveying means disposed on said base plate and adapted to convey a roll film through the medium of said passage part, furnished with a supply part for supplying the roll film and a takeup part for rewinding thereon said roll film, said supply part and said takeup part severally disposed to the left and right of said passage part as separated with a stated distance, and provided between said base plate and either said supply part or said takeup part with an empty space of a stated height;
a first moving member disposed in such a manner as to be moved in the direction of conveyance of said roll film between said base plate and said roll film conveying means and provided with a first retaining member for retaining said roll film; and
a second moving member disposed on said first moving member in such a manner as to be moved in the direction perpendicular to the direction of conveyance of said roll film and provided with a second retaining member for retaining a sheet film.

17. A film carrier according to claim 16, wherein said second moving member, when said first retaining member of said first moving member is located at said passage part, is moved in the direction perpendicular to the direction of conveyance of said roll film and is accommodated in the empty space interposed between said base plate and either said supply part or said takeup part.

18. A film carrier according to claim 17, which further comprises locking means capable of locking said second moving member when said second moving member is accommodated in said empty space.

19. A film carrier according to claim 18, wherein said locking means locks said second moving member when said first retaining member retains said roll film.

20. A film carrier, comprising:
a base plate provided with a passage part allowing passage therethrough of a light for projecting a film;
roll film conveying means provided on said base plate and adapted to convey a roll film through the medium of said passage part, furnished with a supply part for supplying a roll film and a takeup part for rewinding said roll film, said supply part and said passage part severally disposed to the right and left of said passage part as separated by a stated distance;
a first moving member provided with a first retaining member for retaining said roll film at said passage part and disposed on said base plate in such a manner as to be moved in the direction of conveyance of said roll film;
a second moving member provided with a second retaining member for retaining a sheet film in said passage part and disposed on said base plate in such a manner as to be moved in the direction of conveyance of said roll film; and
a guide member disposed on said roll film conveying means near said passage part, adapted to guide said roll film being conveyed via said first retaining member by said roll film conveying means, and allowed to be moved to a guide position for guiding said roll film and to a retracting position recessed backwardly from said guide position.

21. A film carrier according to claim 20, wherein said guide member guides said roll film being conveyed between the supply part of said roll film conveying means and said first retaining member located at said passage part.

22. A film carrier according to claim 20, wherein said guide member guides said roll film being conveyed between said first retaining member located at said passage part and the takeup part of said roll film conveying means.

23. A film carrier according to claim 20, which further comprises drive means for moving said guide member to said retracting position when said second retaining member of said second moving member is located at said passage part.

24. A film carrier according to claim 20, which further comprises an empty space for accommodating said second moving member between said roll conveying means and said base plate.

25. A film according to claim 24, which further comprises an engaging member disposed on said roll film conveying means and adapted to be engaged with said second moving member when said second moving member is accommodated in said empty space and connecting means adapted to connect said guide member to said engaging member and move said guide member to said guide position when said second moving member is engaged with said engaging member.

26. A film carrier according to claim 25, wherein said accommodating empty space is formed between said takeup part and said base plate.

27. A film carrier according to claim 25, wherein said accommodation empty space is formed between said supply part and said base plate.

28. A film carrier, comprising:
a first retaining member movable between an operating position and a retracting position, wherein said first retaining member retains a roll film at said operating position;
film handling means for handling a roll film, wherein said handling means has a supply portion for retaining a cartridge, accommodating a roll film and supplying said roll film and a takeup portion for rewinding therein said roll film; and
a second retaining member for retaining a sheet film, wherein said second retaining member moves between an operating position and a retracting position, wherein said retracting position is under said supply portion or said takeup portion.

* * * * *

UNITED STATES PATENT AND TRADEMARK OFFICE
CERTIFICATE OF CORRECTION

PATENT NO. : 5,223,890

DATED : June 29, 1993

INVENTOR(S) : Katsunori Sakakibara, et al.

It is certified that error appears in the above-identified patent and that said Letters Patent is hereby corrected as shown below:

In col. 11, line 2 (claim 8, last line), after "retains" insert --said--.

In col. 11, line 11 ( claim 10, line 2), after "base" insert --plate--.

In col. 13, line 10 (claim 24, line 3), after "roll" insert --film--.

In col. 13, line 12 (claim 25, line 1), after "film" insert --carrier--.

Signed and Sealed this

Eighth Day of February, 1994

Attest:

BRUCE LEHMAN

*Attesting Officer*  *Commissioner of Patents and Trademarks*